United States Patent
Lee et al.

(10) Patent No.: US 6,892,195 B2
(45) Date of Patent: May 10, 2005

(54) SYSTEM AND METHOD FOR CONFIGURING SELL BIDS

(75) Inventors: Juhnyoung Lee, Yorktown Heights, NY (US); Ho Soo Lee, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 09/848,426

(22) Filed: May 4, 2001

(65) Prior Publication Data

US 2002/0165844 A1 Nov. 7, 2002

(51) Int. Cl.[7] .............................................. G06N 5/04
(52) U.S. Cl. ...................................................... 706/61
(58) Field of Search ............................ 706/61, 59, 60, 706/15; 705/7, 35, 80

(56) References Cited

U.S. PATENT DOCUMENTS

| | | | | |
|---|---|---|---|---|
| 5,926,800 A | * | 7/1999 | Baronowski et al. | 705/35 |
| 6,295,513 B1 | * | 9/2001 | Thackston | 703/1 |
| 2001/0037321 A1 | * | 11/2001 | Fishman et al. | 705/500 |
| 2002/0010685 A1 | * | 1/2002 | Ashby | 705/80 |
| 2002/0138316 A1 | * | 9/2002 | Katz et al. | 705/7 |
| 2002/0147695 A1 | * | 10/2002 | Khedkar et al. | 706/15 |
| 2002/0165844 A1 | * | 11/2002 | Lee et al. | 706/61 |

OTHER PUBLICATIONS

Fuhr, N. and Pfeifer, U., Probabilistic Information Retrieval as a Combination of Abstraction, Inductive Learning, and Probabilistic Assumptions, Jan. 1994, ACM Transactions on Information Systems, vol. 12 Issue 1, pp. 92–115.*

* cited by examiner

*Primary Examiner*—Anthony Knight
*Assistant Examiner*—Michael B. Holmes
(74) *Attorney, Agent, or Firm*—McGuireWoods LLP; Stephen C. Kaufman (57) ABSTRACT

A system and method for configuring sell bids. The system and method use rules and inference engines in order to configure sell bids in view of Request for Quotes (RFQs). The system and method include a data aggregator that integrates data from two or more enterprise data sources into an aggregated enterprise database and a knowledge base database. A bid configurator constructs one or more sell bid candidates for one or more target RFQs by using at least one inference engine and the extracted facts and rules from the knowledge database.

18 Claims, 7 Drawing Sheets

RULES FOR PRODUCT SPECIFICATION

- IF A PRODUCT/SERVICE'S GROSS MARGIN >50%, THEN GIVE THE HIGHEST PRIORITY TO IT AMONG ALTERNATIVES.
- IF A PRODUCT/SERVICE'S GROSS MARGIN < 35%, THEN GIVE THE LOWEST PRIORITY TO IT AMONG ALTERNATIVES.
- IF A PRODUCT'S ON-HAND INVENTORY > 4 WEEKS IN SUPPLY, THEN GIVE THE HIGHEST PRIORITY TO IT AMONG ALTERNATIVES.
- IF A PRODUCT'S ON-HAND INVENTORY <2 WEEKS IN SUPPLY, THEN GIVE THE LOWEST PRIORITY TO IT AMONG ALTERNATIVES.
- IF A BUYER'S REPUTATION RATE IS BETTER THAN 4, THEN APPLY 3% DISCOUNT RATE.

RULES FOR SERVICE SPECIFICATION

- IF A BUYER'S REPUTATION RATE IS BETTER THAN 3, THEN ADD A YEAR TO THE STANDARD WARRANTY PERIOD.

RULES FOR BUYER QUALIFICATION

- IF A BUYER'S STOCK VALUE HAS DECREASED MORE 50 % IN THE LAST 1 YEAR, THEN ASSIGN THE LOWEST PRIORITY TO ITS RFQ.

SELLING POLICIES

- LIMIT THE MIN/MAX NUM OF BUYERS.
- NO BUYER RECEIVES MORE THAN 40% OF THE BUSINESS.

SYSTEM AND METHOD FOR CONFIGURING SELL BIDS

BACKGROUND OF THE INVENTION

1. Field of the Invention

The present invention generally relates to online selling of products or services over a computer network, and more particularly, to a method for purchasing and selling products or services in a networked environment using a request for quotation process and a rule-based system for configuring sell bids having multiple attributes.

2. Background Description

Commerce over networks, particularly electronic commerce (e-commerce) over the Internet, has increased significantly over the past few years. In e-commerce models, buyers and sellers make trades, e.g., buy and sell services or products, over the World Wide Web portion of the Internet. In one example, one or more web pages, typically referred to as an electronic marketplace (e-marketplace), provide one or more different forms of trading mechanisms including auctions, reverse auctions and exchanges. In an auction, one seller receives bids from one or more buyers for one or more products before making a transaction. In contrast, a reverse auction allows one buyer to receive bids from one or more potential sellers. In an exchange, multiple buyers and multiple sellers submit asks and bids, respectively, to a marketplace. The marketplace then makes matches between the asks and bids of the buyers and sellers, either continuously or periodically.

It is known, of course, that these trading models have many different variations. These auction variations may include English (buyers call ascending prices), Dutch (market manager calls descending prices to obtain buy bids), Japanese (market manager calls ascending prices to obtain buy bids) and sealed bid (buyers place sealed bids) auctions. In still other variations of auctions, there is an open Request for Bids and a sealed Request For Bids. In the open Request for Bids, buyers may call ascending prices and a seller manually selects the winning price. In the sealed Request for Bids, buyers submit sealed bids and a seller manually selects the winning bid.

There are also variations on reverse auctions which include reverse English (sellers call descending prices), reverse Dutch (market manager call ascending prices to obtain sell bids), reverse Japanese (market manager calls descending prices to obtain sell bids) and reverse sealed bid (sellers place sealed bids) auctions. Reverse auctions further include open Request For Quotes and sealed Request For Quotes. In the open Request for Quotes, the sellers call descending prices and a buyer manually selects a winning price, and in the sealed Request for Quotes the sellers submit sealed bids and a buyer manually selects the winning quote. Exchanges also include variations. These variations include continuously clearing exchanges and periodically clearing exchanges.

The Request for Quotation (RFQ) is used often in the e-marketplace. In this type of environment, a request is submitted by a buyer to an e-marketplace to invite potential sellers to bid on specific products or services needed by the buyer. The RFQ process is useful in all markets that depend upon attributes other than price such as delivery time, quantity discounts, warranty, seller qualification and other factors. In these RFQ processes, the buyers are permitted to manually select one or more bids from sellers after examining and comparing submitted sell bids. In this manner, the RFQ process allows the sellers to match exactly the buyers' requirements (including the attributes of price, delivery time, warranty, seller qualification and other factors) thus leading to a strong rate of return and high satisfaction ratings.

Depending on the needs of the organization in which a buyer represents, a buyer can submit multiple requests on one or more products or services to one or more electronic marketplaces. Likewise, a seller can find multiple requests on products and services that the seller can fulfill in one or more e-marketplace existing in the Internet. In this situation, a seller needs strategies and tactics for deciding, for example, (i) what requests available in e-marketplaces the seller wants to submit bids to and (ii) what offers the seller wants to make in bids for each of the selected requests. Decisions for these questions need to maximize the revenue and/or profit of the seller and minimize administration cost for RFQ processes, while considering various constraints such as limited inventory, manufacturing capacity, delivery capability and others. The decision-making problem thus becomes one of optimization with objectives, constraints, and a number of unknown variables. Also, it becomes an information search problem.

Rule-based systems, or more generally knowledge-based expert systems, use human knowledge to solve problems that normally would require human intelligence. These expert systems represent the expertise knowledge as data or rules within the computer. These rules and data can be called upon when needed to solve problems. Conventional computer programs perform tasks using conventional decision-making logic containing little knowledge other than the basic algorithm for solving that specific problem and the necessary boundary conditions. This program knowledge is often embedded as part of the programming code, so that as the knowledge changes the program has to be changed and then rebuilt. Knowledge-based systems collect the small fragments of human know-how into a knowledge base which is used to reason through a problem, using the knowledge that is appropriate.

Rule-based programming is one of the most commonly used techniques for developing expert systems. In this programming paradigm, rules are used to represent heuristics, or "rules of thumb," which specify a set of actions to be performed for a given situation. A rule is composed of an "if" portion and a "then" portion. The "if" portion of a rule is a series of patterns which specify the facts (or data) which cause the rule to be applicable. (The process of matching facts to patterns is called pattern matching.) The expert system tool provides a mechanism, called the inference engine or the shell, which automatically matches facts against patterns and determines which rules are applicable. The "if" portion of a rule can actually be thought of as the "whenever" portion of a rule since pattern matching always occurs whenever changes are made to facts. The "then" portion of a rule is the set of actions to be executed when the rule is applicable. The actions of applicable rules are executed when the inference engine is instructed to begin execution. The inference engine selects a rule and then the actions of the selected rule are executed (which may affect the list of applicable rules by adding or removing facts). The inference engine then selects another rule and executes its actions. This process continues until no applicable rules remain.

Problems with the Prior Art

One problem with the prior art for deciding what offers to make in bids for selected requests for quotation from buyers is that it requires a seller to manually decide and specify the details of offers the seller makes for individual requests. This approach requires the seller to understand and remember a large amount of detailed information such as inventory data, fulfillment system data, buyer data, historical data about RFQ processes, and the current and historical market data that involves in the realization of the seller's objectives such as maximizing revenue/profit while minimizing administration cost, and to apply the information to configuring individual sell bids. This approach is not effective nor realistic due to the amount of involved information and the complexity of the optimization for achieving the objectives. Although it is possible to achieve relatively effective results with this manual ad hoc approach, it does not explain different results that would be caused by taking alternative options.

SUMMARY OF THE INVENTION

An object of the present invention is to provide a system and method for configuring sell bids for Request for Quotes (RFQ) processes over a network.

An object of the present invention is to provide a system and method for configuring sell bids having two or more attributes over the network.

An object of the present invention is to provide a system and method for configuring sell bids having two or more attributes over the network while not requiring the seller to manually understand and remember a large amount of detailed information that involves the realization of the seller's objectives such as maximizing revenue/profit while minimizing administration cost.

An object of the present invention is to provide a system and method for configuring sell bids having two or more attributes over the network while considering constraints such as limited inventory, manufacturing capacity, delivery capability and others.

An object of the present invention is to provide a system and method for creating, adding to, and/or modifying knowledge bases by using aggregated data from various enterprise systems such as inventory systems, fulfillment systems, logistics systems, supply chain systems, procurement systems and others.

An object of the present invention is to provide a system and method for configuring sell bids by using inference engines, suggested attribute values of a request for quotation under consideration and knowledge base systems that provides facts (or data) and rules about the seller's enterprise and markets.

An object of the present invention is to provide a system and method for allowing sellers to revise the content of sell bids automatically configured by the system.

The present invention focuses on RFQ process, i.e., the creation of one or more bids by a seller in response to requests. The present invention further focuses on the problem of decision-making for what offers to make in bids for each of the selected requests for products or services. This invention presents a system and method for automatically configuring a sell bid by using a rule-based system.

In one aspect of the present invention, a computer system is provided for ranking one or more objects having two or more attributes. The system includes a data aggregator that integrates data from two or more enterprise data sources into an aggregated enterprise database, and a knowledge base generator that constructs a knowledge base by extracting facts and/or rules from the aggregated enterprise database and stores the facts and rules in a knowledge base database. A bid configurator is also provided which constructs sell bid candidates for target RFQs by using inference engines and the extracted facts and rules from the knowledge base database. In embodiments, the sell bid may be revised using a bid revision module.

The present invention also includes a method for configuring one or more sell bids. The method may be implemented via a machine readable medium containing code. The steps for implementing the method of the present invention include aggregating data from one or more enterprise data sources and storing the aggregated enterprise data in an integrated database system. The method extracts one or more facts useful for bid configuration from the integrated database system and derives one or more rules useful for bid configuration from the integrated database system. One or more knowledge base systems are constructed by storing the facts and rules in a form that is understood by an inference engine. The sell bid candidates are then constructed for one or more target RFQs by running one or more facts and rules from the target RFQs and the knowledge base system to the inference engine.

In embodiments, the method may further review and revise the content of one or more of the sell bid candidates, if necessary. Also, the inference engine may match facts against patterns and determine which rules are applicable. It is also contemplated by the present invention to construct the one or more knowledge base systems from business rules, as well as storing and filtering facts and creating and storing rules.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
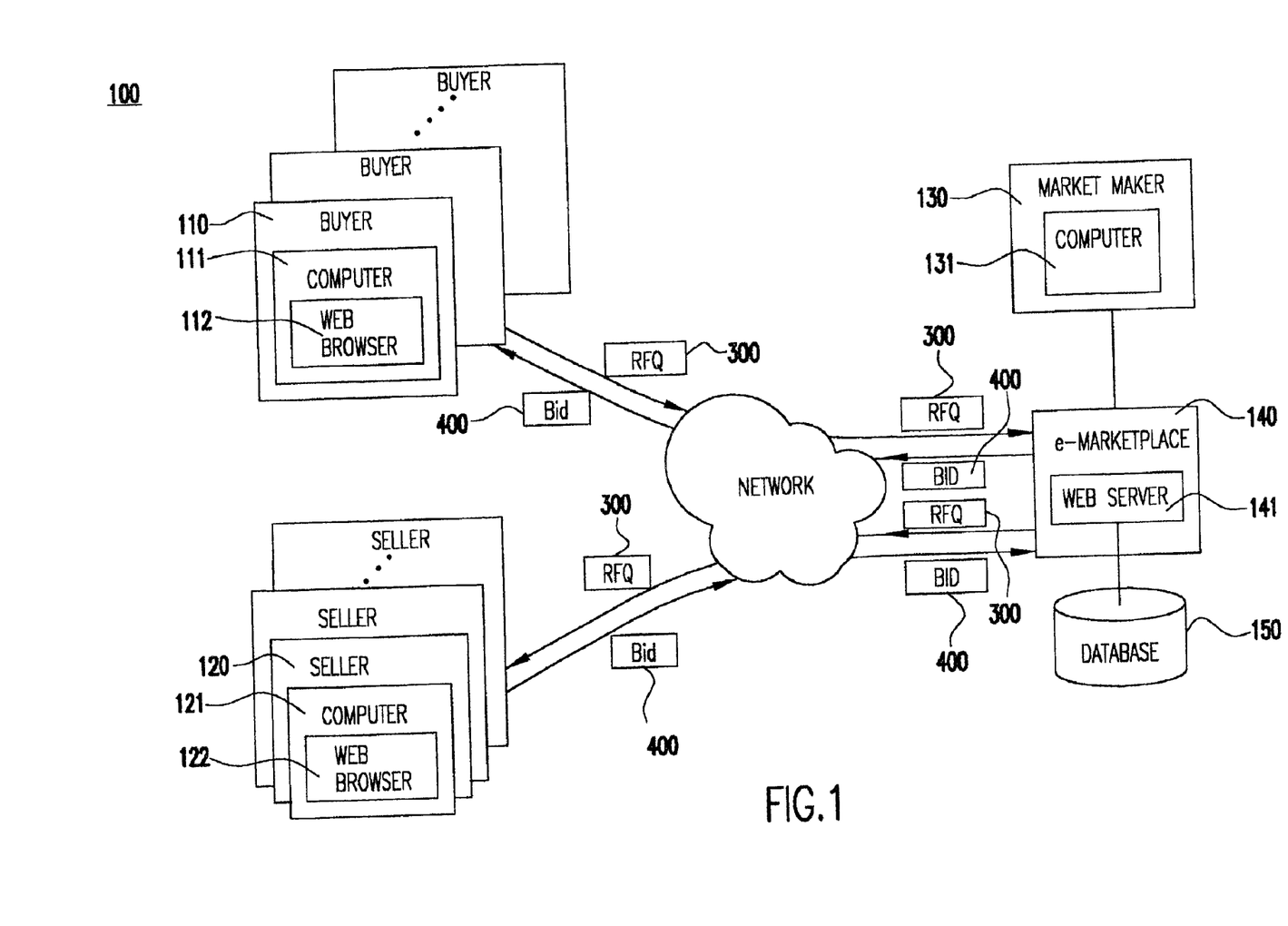
FIG. 1 is a block diagram of a system architecture of an electronic marketplace in accordance with the present invention.

Referring now to the drawings, FIG. 1 shows a block diagram of a system architecture of an electronic marketplace in accordance with the present invention. In particular, the architecture of the e-marketplace includes one or more buyers 110 accessing Web browser programs 112 via one or more computers 111. The buyers 110 submit Request for Quotes (RFQ) 300 via the web browser programs 112 over a network 160 to an e-marketplace 140 preferably implemented by a web server 141. The web server 141 stores the RFQ 200 as well as other information such as, for example, product catalogs, seller and buyer information and the like in one or more database system 150. A market maker 130 may operate the e-marketplace 140 via a computer 131. Once the RFQ 300 is submitted, the e-marketplace 140 will post the RFQ 300 on the web server 141.

Still referring to FIG. 1, one or more sellers 120 may access the e-marketplace 140 over the network 160 via a web browser program 122 residing on a seller computer 121. The web browser programs 112 and 122 as well as the web server 141 preferably use HyperText Transfer Protocol (HTTP). The sellers 120 may find and access the posted RFQ 300 via the web browser program 122, and thereafter submit one or more sell bids 400 having attribute values to the e-marketplace 140 via the network 160. The sell bid 400 and associated attribute values may be stored in the database 150 as well as transmitted to the buyer's web browser 112 over the network 160. Also, the web pages associated with both of the web browser programs 112 and 122 may provide a structured form for entering the appropriate information such as, for example, the RFQ and the submitted bids. The buyer 110 who made the RFQ 300 selects winners among the submitted sell bids 300.

Figure 2:
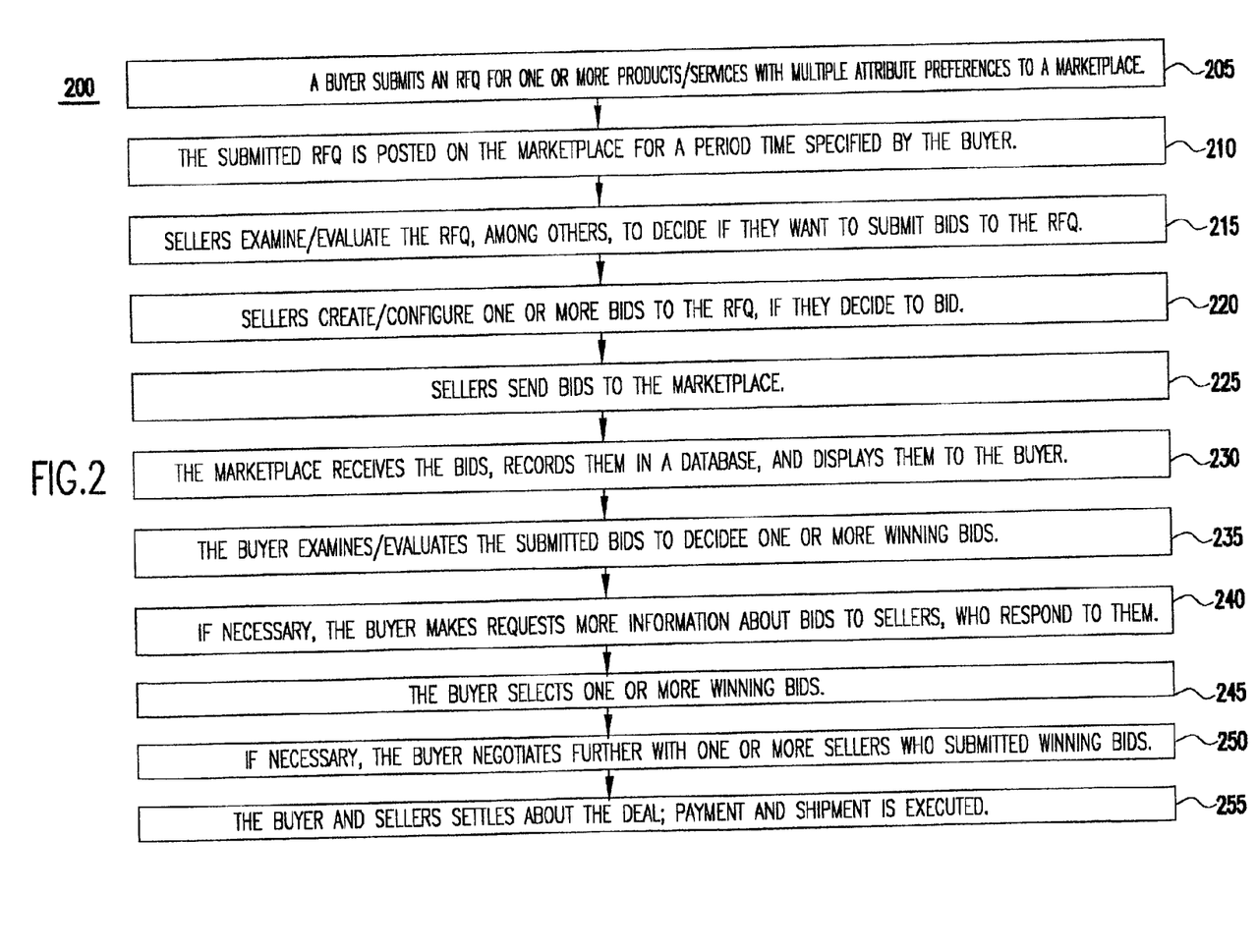
FIG. 2 is a flow chart of a Request for Quotes (RFQ) process in accordance with the present invention.

FIG. 2 is a flow chart showing the method of the present invention implemented using the system architecture of FIG. 1. It should be understood by those of skill in the art that the e-marketplace as well as the other components of FIG. 1 are adapted to implement the steps of FIG. 2. Also, FIG. 2 may equally represent a high level block diagram capable of implementing the steps provided therein.

Figure 5:
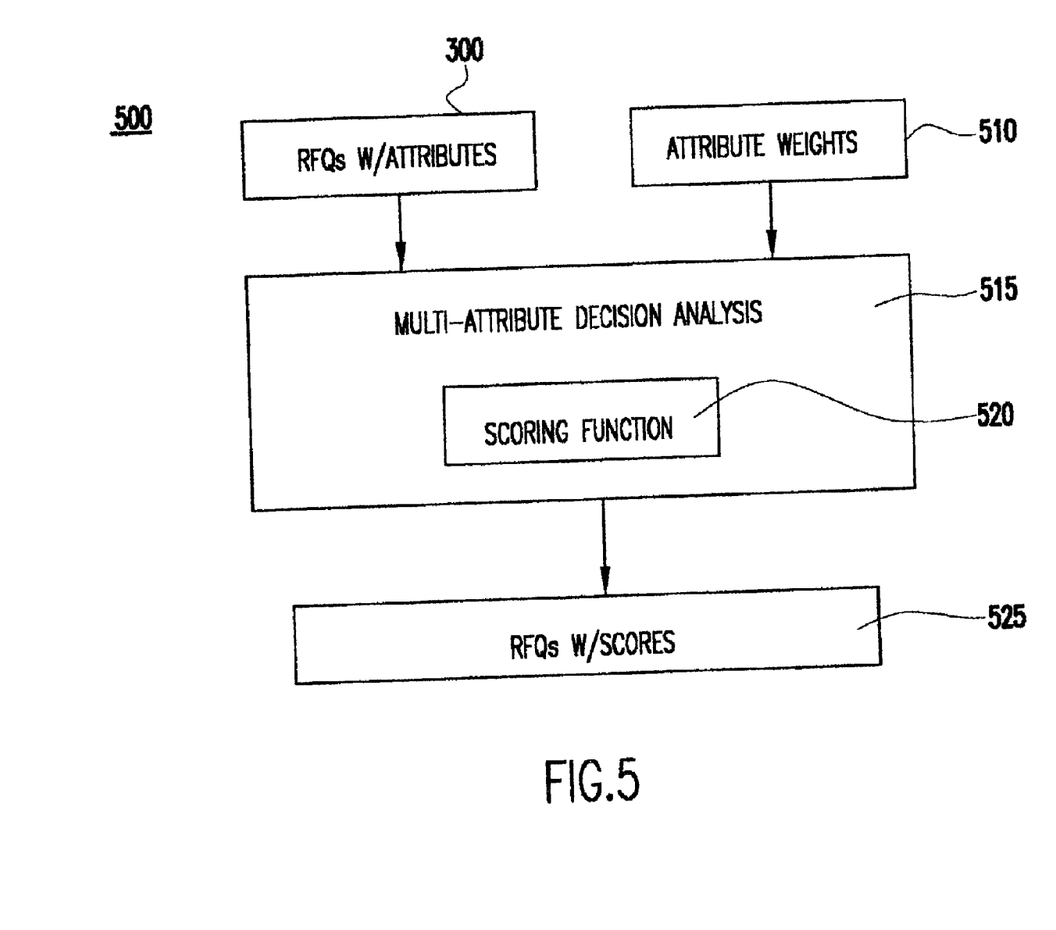
FIG. 5 is a block diagram of an RFQ selection process in accordance with the present invention.

At step 205, the buyer 110 submits one or more RFQs 300 for one or more products or services having one or more attribute preferences to one or more electronic marketplaces 140 over a network 160. At step 210, the market maker 130 allows the submitted RFQ 300 to be posted on the e-marketplace 140 for a period of time specified by the buyer 110. While RFQs 300 are posted in the e-marketplace 140, the seller 120 examines and evaluates the RFQs 300 and decides whether to submit sell bids to the RFQs 300, at step 215. For selecting one or more RFQs to submit bids to, a seller 120 may use a scoring function 520 for multi-attribute decision analysis 515 as shown in FIG. 5. At step 220, the seller 120 creates offers for each of the selected RFQs 300 by configuring the details of the offers using inference engines 671, the suggested attribute values of the RFQ 300 under consideration, and knowledge base systems 660 that provides facts (or data) and rules about the seller's enterprise and market. The system for performing the method of automatically configuring sell bids is described in detail in FIG. 6. Once the seller creates one or more bids 400 for an RFQ 300, it sends them to the marketplace 140, at step of 225.

Next, at step 230, when the market maker 130 of the marketplace 140 receives the bids 400 from sellers 120, the market maker 130 records them in the database 150 and also displays them to buyers 110, who submitted the RFQs 300 for the bids 400, so that the buyers may find matches between RFQs 300 and submitted sell bids 400. At step 235, the buyers 110 examine and evaluate the submitted bids 400 to the RFQs 300 to decide one or more winning bids. For selecting winning bids among the submitted bids, buyers may use a method similar to one presented in FIG. 5 that uses one or more scoring functions 520 for multi-attribute decision analysis 515. Also the buyers 110 may use other decision making methods for the bid selection. At step 240, if necessary, the buyer 110 may make requests for more information about one or more submitted sell bids 400 to their sellers 120. The market maker 130 can allow such communications between buyers 110 and sellers 120 as a function of the marketplace 140 so that all the communication may be performed online over the network 160 and the marketplace 140 without depending on off-line communication methods such as facsimile, telephone, telegrams and postal mails. At step 245, the buyer 110 selects one or more winning bids among the submitted bids.

Negotiation and settlement is still left to complete the RFQ process. As specified at step 250, the buyer and one or more sellers of the winning sell bids may negotiate further on various items that may be specified in the RFQ and then bid or not bid. The communication between buyers and sellers may be performed either on-line in the marketplace 140 over the network 160 or off-line by using such methods as facsimile, telephone, telegrams and postal mails. Once the negotiation is completed, the buyer 110 and the sellers 120 settle the deal (step 255); that is, payment is made by the buyer 110 and shipment or fulfillment of the purchased products or services is made by the sellers 120.

Figure 3:
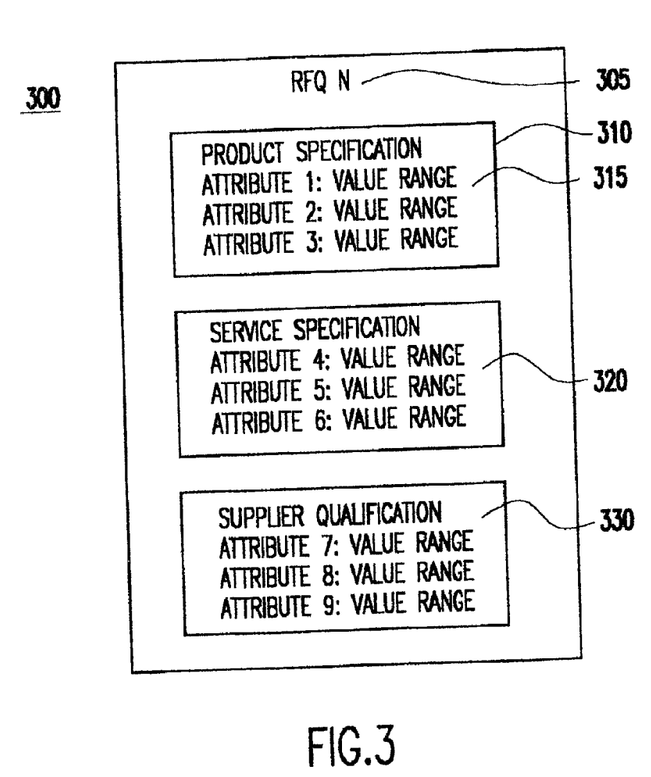
FIG. 3 is an example of an RFQ having multiple attributes.

FIG. 3 is an example of an RFQ having multiple attributes. An RFQ is submitted by a buyer 110 to an electronic marketplace 140. An RFQ has an identification number 305 and comprises one or more attributes that may belong to one or more categories. Attributes are either numeric or categorical. Each attribute consists of a pair of name and value range 315. The value range of a numeric attribute specifies the lower and upper limits of desirable attribute values. On the other hand, the value range of a categorical attribute specifies the names that are acceptable for the category. In the example of FIG. 3, there are three attribute categories: product specification 310 (that includes attributes such as price, material quality and properties, color and size); service specification 320 (that includes delivery time and cost, and warranty); and supplier qualification 340 (that includes trading history, experience and reputation. Each category is composed of three attributes.

Figure 4:
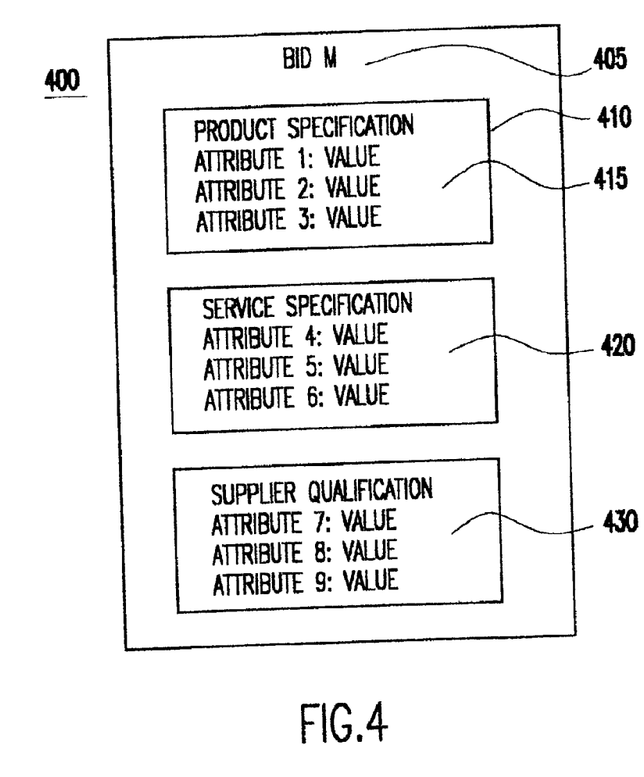
FIG. 4 is an example of bids having multiple attributes.

FIG. 4 is an example of bids having multiple attributes. Bids are submitted by the sellers 120 in response to RFQs 300 in an electronic marketplace 140. A sell bid has an identification number 405 and comprises one or more attributes (and their values) that are specified in the RFQ 300 which this particular bid is submitted thereto. As in RFQ 300, attributes may be divided into several categories. Also, each attribute includes a name and value pair 415. In the example of FIG. 4, there are three attribute categories, i.e., product specification 410, service specification 420, and supplier qualification 430, each of which is composed of three attributes.

FIG. 5 is a block diagram of a RFQ selection process. The RFQ selection process receives two pieces of input data: a set of RFQs 300, where individual RFQs have two or more attributes, and a set of attribute weights 510, where each weight specifies the importance of the corresponding attribute in the task of RFQ selection. Receiving the input data 300 and 510, the multi-criteria decision analysis module 515 computes the score of the input RFQs, one for each, by using a scoring function 520 that takes into account the attribute values of individual RFQs 300 and the weights of attributes 510. An example of a scoring function 520 for the multi-criteria decision analysis module is a linear combination of the weighted values of the attributes, i.e., $$S_i = \Sigma_j w_j f(a_{ij}), \text{ for all } i,$$

where $S_i$ denotes the score of object i, $w_j$ the weight of the attribute j, $a_{ij}$ the value of attributed j of object i, and f( ) a transformation of attribute value $a_{ij}$. The value of an attribute for an RFQ is selected from the value range 315 of the attribute given in the RFQ. The output of the multi-criteria decision analysis module is a set of RFQs with scores 525, where each RFQ in the input set 300 has a score given by the module.

Figure 6:
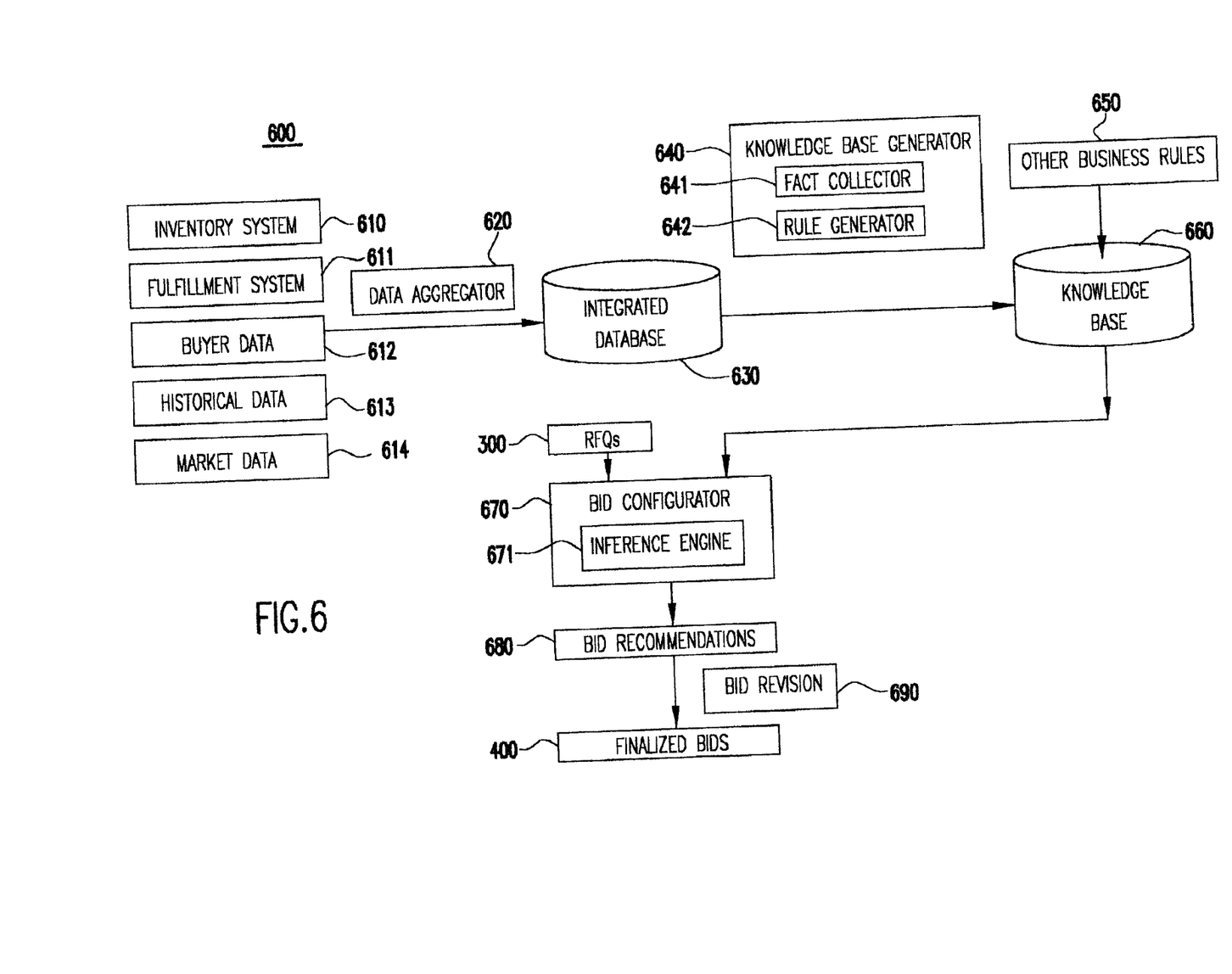
FIG. 6 is a block diagram of a bid configuration system in accordance with the present invention.

FIG. 6 is a block diagram of a bid configuration system in accordance with the present invention. FIG. 6 may also represent a flow chart implementing the steps of a bid configuration in accordance with the present invention. A feature of the system is the bid configurator component 670 that automatically configures one or more sell bids that will achieve the seller's objectives (such as maximizing the revenue and/or profit, and minimizing the administration cost) under various constraints (such as limited inventory capacity, customer service capability, and fulfillment capability) by using a rule-based system. To achieve this goal of the bid configurator 670, an effective inference engine 671 and a knowledge base system 660 (that contains an effective set of facts and rules), along with the enterprises objectives and constraints may be required by the system and method of the present invention.

Figure 7:
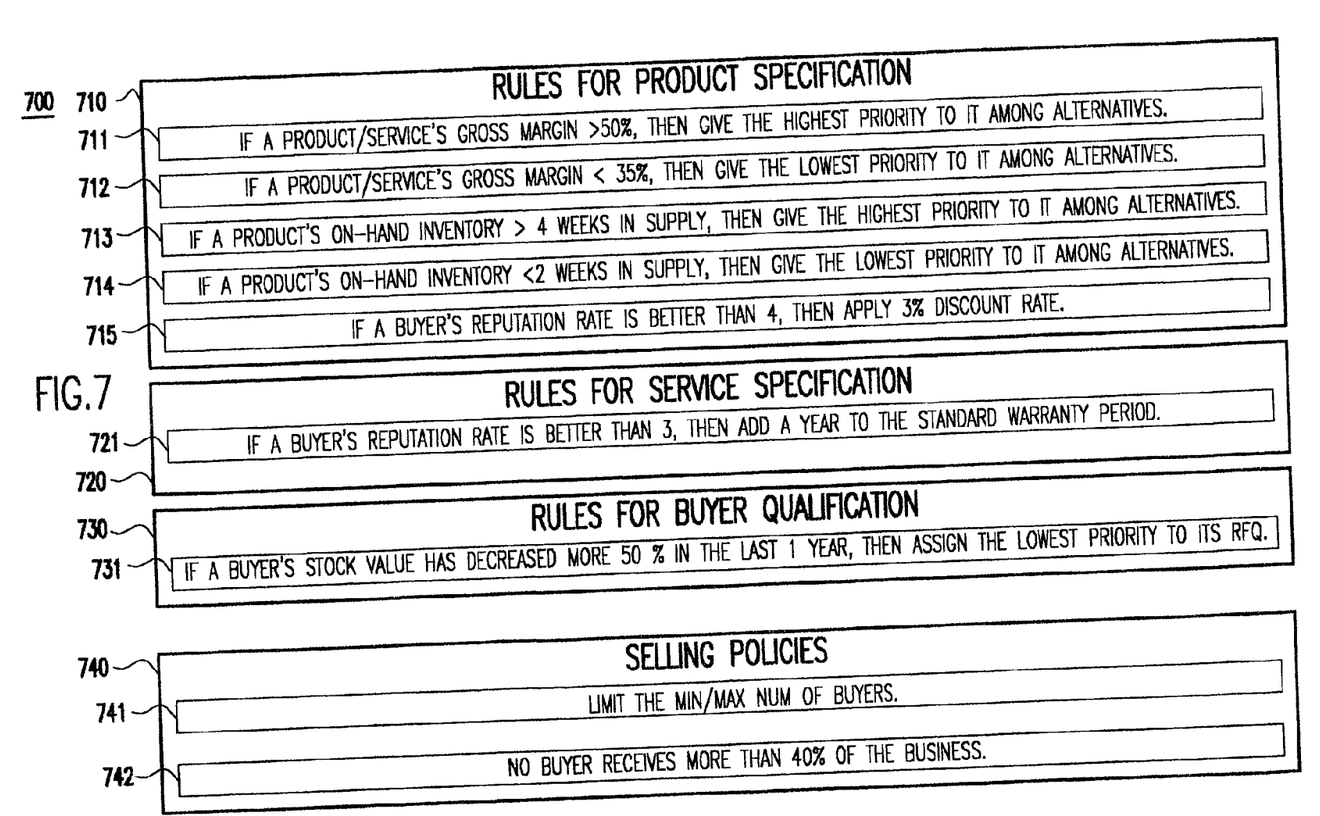
FIG. 7 shows examples of rules for bid configuration.
Figure 8:
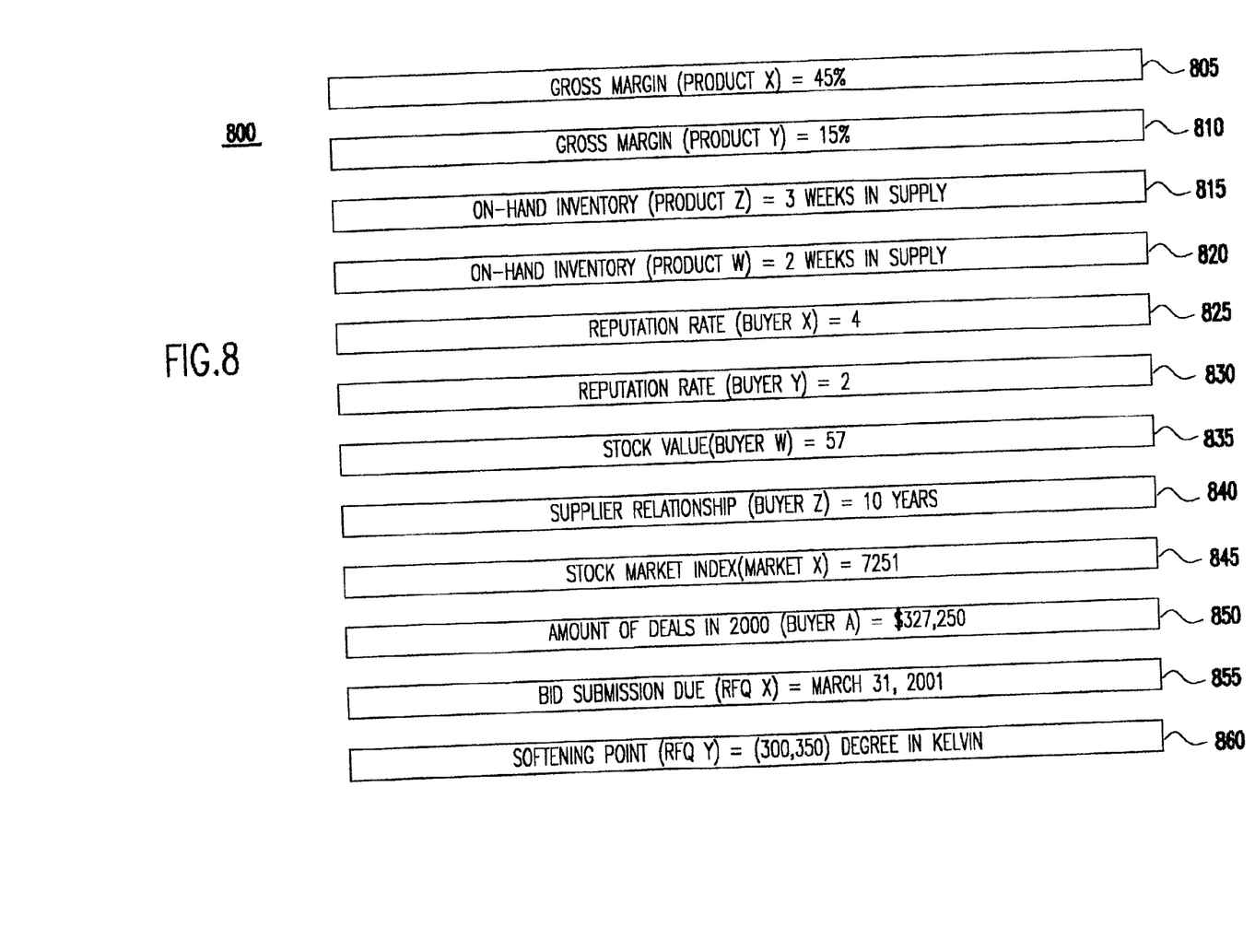
FIG. 8 shows examples of facts for bid configuration.

Examples of the rules and facts that may be necessary for effectively configuring sell bids 400 for RFQs will be presented in FIGS. 7 and 8, respectively. In the present invention, the rules and facts will be extracted from various enterprise systems and other data sources, which include inventory systems 610, fulfillment systems 611, database containing buyer information 612, database containing historical information of RFQ processes and sales 613, and database containing market information 614. In embodiments, other data sources such as product information, supply chain information, customer service information, and information from trading partners (e.g., distributors, and logistics providers) may be included as rules and facts. Before extracting facts and rules for bid configuration, the information from these data sources should be aggregated into a single data model in a data warehouse 630 (also known as aggregated enterprise database or integrated database system) to clean up noises and contradictory information out of the database, and provide a consistent and integrated view over the aggregated enterprise database 630. The data aggregator module 620 creates and updates the content of the integrated database system 630 by using the information from the data sources 610, 611, 612, 613, and 614.

From the information stored in the integrated database 630, a knowledge base system 660 is constructed. The knowledge base generator 640 has two components: the fact collector 641 and the rule generator 642. The fact collector 641 identifies and filters data (or facts) that will be useful for bid configuration from the integrated database 630, and stores the facts in the knowledge base system 660 in the form that is understood by the inference engine 671 used by the bid configurator 670. The rule generator 642 searches for the integrated database 630, creates useful rules out of given data, and stores them in the knowledge base system 660 in the form that is understood by the inference engine 671. A rule is composed of an "if" portion and a "then" portion. The "if" portion of a rule is a series of patterns which specify the facts (or data) which cause the rule to be applicable. The process of matching facts to patterns is called pattern matching. The "if" portion of a rule may be thought of as the "whenever" portion of a rule since pattern matching always occurs whenever changes are made to facts. The "then" portion of a rule is the set of actions to be executed when the rule is applicable. To create such rules out of plain data stored in the integrated database 630, the process requires certain understanding to the data and how it is used by the system. An example of a method that may be used to automatically generate rules out of data is to use one or more data mining techniques that identifies certain patterns out of given historical data. The patterns identified by data mining algorithms may be turned into rules, if identified useful for bid configuration. In addition to facts and rules extracted from the integrated database 630, the knowledge base system 660 may contain other business rules 650 such as selling policies and trading partner agreement of the seller's organization that are not found in the integrated database 630.

Once the knowledge base system 660 that provides facts and rules stored in the form understood by the inference engine 671 is given, the bid configurator 670 is ready to automatically construct one or more sell bids 400 for RFQs 300. When the bid configurator 300 receives one or more RFQs (and their accompanying attributes and their value ranges) as input, it constructs one or more offerings by identifying particular values for individual attributes given by the RFQs, aiming to realize the objectives of the seller's enterprise such as maximizing the revenue and/or profit, and minimizing the administration cost under certain constraints such as limited inventory capacity, customer service capability, and fulfillment capability. Once the bid configurator 670 provides one or more candidates 680 for sell bids for target RFQs, the system allows the seller to review and manually revise the bid candidates 680 to fine-tune and finalize the sell bids 400.

FIG. 7 shows examples of rules for bid configuration. As described above, the rules used for bid configuration are derived from the integrated database system 630 that provides a consistent view over various sources of enterprise data 610, 611, 612, 613, and 614. In the example of FIG. 7, rules are categorized by the types of attribute values they are used to be created for, i.e., there are rules used for creating the values of attribute belonging to the product specification 710, service specification 720, buyer qualification 730, and selling policies 740.

More specifically, the rules for product specification include rules that consider gross margin or the current inventory level to decide products to offer in sell bids 711, 712, 713, and 714. Also, there is a rule that adjusts the price of products or services by a discount rate considering the buyer's reputation 715. An example of rules for service specification is a rule which adjusts the warranty period of products considering the buyer's reputation 721. An example of rules for buyer qualification is a rule used to select an RFQ to submit bids to by considering the change of the buyer's stock price in the market 731. Examples of the selling policies are limiting the minimum and/or maximum number of buyers 741, or no buyer receiving more than 40% of the seller's business to avoid dependency on business 742. Of course other rules may also be used with the present invention.

FIG. 8 shows examples of facts for bid configuration. As described above, the facts used for bid configuration are derived from the integrated database system 630 that provides a consistent view over various sources of enterprise data 610, 611, 612, 613, and 614, and stored in the knowledge base system 660 in the form that is understood by the inference engine 671. In the example of FIG. 8, a number of facts that are related to the rules in FIG. 7 include, for example, facts about gross margin and the current inventory level of particular products 805, 810, 815, and 820 facts about reputation rate, stock value, supplier relationship length in year, the amount of the business deals in a particular year of a particular buyer 825, 830, 835, 840, and 850 facts about stock market index value 845, and facts about bid submission due and value range of a product attribute of a particular RFQ 855 and 860.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer system for ranking one or more objects having two or more attributes, comprising:
   - a data aggregator that integrates data from two or more enterprise data sources into an aggregated enterprise database;
   - a knowledge base generator that constructs a knowledge base by extracting at least one of facts and rules from the aggregated enterprise database and stores the facts and rules in a knowledge base database; and
   - a bid configurator that constructs one or more sell bid candidates for one or more target Request for Quotes (RFQs) by using at least one inference engine and the extracted facts and rules from the knowledge base database.

2. The system of claim 1, wherein the enterprise data sources include one or more data sources selected from the group consisting of (i) inventory systems, (ii) fulfillment systems, (iii) customer service systems, (iv) database systems that contain product information, (v) database systems that contain buyer information, (vi) database systems that contain historical information about trading and sales, (vii) database systems that contain market information and (viii) computer systems of trading partners including distributors and logistics providers.

3. The system of claim 1, wherein the knowledge base database comprises facts and rules stored in the form that is understood by the at least one inference engines.

4. The system of claim 1, wherein the facts are truthful data about one or more of objects selected from the group consisting of products, services, buyers, sellers, stock markets, sell bids, RFQs, and marketplaces.

5. The system of claim 1, wherein the rules comprise an "if" portion and a "then" portion, the "if" portion of the rule is a series of patterns which specify the facts which cause the rule to be applicable and the "then" portion of the rule is a set of actions to be executed when the rule is applicable.

6. The system of claim 3, wherein the at least one inference engine matches the facts against patterns and determines which rules are applicable.

7. The system of claim 1, wherein the one or more sell bid candidates comprise one or more attribute name and value pairs, each of which belongs to one or more attribute categories.

8. The system of claim 1, wherein the RFQs comprise one or more attribute name and value-range pairs, each of which belongs to one or more attribute categories.

9. The system of claim 7, wherein the attribute categories include attributes selected from the group consisting of product specification, service specification and seller qualification.

10. The system of claim 1, wherein the knowledge base generator further constructs the knowledge base database from other business rules including at least one of selling policies and trading partner agreement of a seller's organization not found in the aggregated enterprise database.

11. The system of claim 1, wherein the knowledge base generator includes a fact collector and a rule generator, the fact collector identifies and filters the data or facts that are useful for bid configuration from the aggregated enterprise database and stores the facts in the knowledge base database in the form that is understood by the at least one inference engine used by the bid configurator, and the rule generator searches for the aggregated enterprise database, creates useful rules out of given data, and stores the useful rules in the knowledge base database in the form that is understood by the at least one inference engine.

12. The system of claim 1, further comprising a bid revision module that allows one or more sellers to review and revise content of the one or more sell bid candidates that are constructed for one or more target RFQs from the bid configurator.

13. A method of configuring one or more sell bids, comprising the steps of:
   - aggregating data from one or more enterprise data sources;
   - storing the aggregated enterprise data in an integrated database system;
   - extracting one or more facts useful for bid configuration from the integrated database system;
   - deriving one or more rules useful for bid configuration from the integrated database system;
   - constructing one or more knowledge base systems by storing the facts and rules in a form understood by one or more inference engines; and
   - constructing one or more sell bid candidates for one or more target RFQs by running one or more facts and rules from the target RFQs and the knowledge base system to the one or more inference engines.

14. The method of claim 13, further comprising the step of reviewing and revising content of one or more of the sell bid candidates, if necessary.

15. The method of claim 13, wherein the one or more inference engines matches the facts against patterns and determines which rules are applicable.

16. The method of claim 13, further comprising the steps of constructing the one or more knowledge base systems from business rules including at least one of selling policies and trading partner agreement of a seller's organization not found in the knowledge base system.

17. The method of claim 13, further comprising the steps of:
   - identifying and filtering the data or facts that are useful for bid configuration from the integrated database system;
   - storing the facts in the one or more knowledge base systems in the form that is understood by the one or more inference engines;
   - creating useful rules out of the data; and
   - storing the useful rules in the one or more knowledge base systems in the form that is understood by the one or more inference engines.

18. A computer readable medium containing code for configuring one or more sell bids, the code implementing the steps of:
   - aggregating data from one or more enterprise data sources;
   - storing the aggregated enterprise data in an integrated database system;
   - extracting one or more facts useful for bid configuration from the integrated database system;

deriving one or more rules useful for bid configuration from the integrated database system;

constructing one or more knowledge base systems by storing the facts and rules in a form understood by one or more inference engines; and constructing one or more sell bid candidates for one or more target RFQs by running one or more facts and rules from the target RFQs and the knowledge base to the one or more inference engines.

* * * * *